United States Patent Office 3,423,479
Patented Jan. 21, 1969

3,423,479
MIXTURES OF ORGANOPOLYSILOXANES AND POLYARYLENE POLYETHERS
Edward G. Hendricks, Belle Mead, N.J., assignor to Union Carbide Corporation, a corporation of New York
No Drawing. Filed June 14, 1965, Ser. No. 463,896
U.S. Cl. 260—824        11 Claims
Int. Cl. C08g 43/02

ABSTRACT OF THE DISCLOSURE

Mixtures of organopolysiloxanes and thermoplastic linear polyarylene polyethers of the —O—E—O—E'— type wherein E is the residuum of a dihydric phenol and E' is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms characterized by improved impact strength and resistance to thermal stress embrittlement.

---

This invention relates to mixtures of organopolysiloxanes and polyarylene polyethers, and in particular to such mixtures characterized by improved notched impact strength and improved resistance to thermal stress embrittlement.

Polyarylene polyethers are substantially linear thermoplastic polymers that exhibit excellent mechanical, physical, chemical, and electrical properties, and are especially attractive for their superior thermal properties. These polymers can be molded by conventional techniques into shaped articles for a wide variety of end uses. These polymers are ductile, machinable, self-extinguishing, and nondripping, and are inert to both mineral acid and caustic. More importantly, because of the superior thermal properties of these polymers, they retain their properties at elevated temperatures surpassing the elevated temperature capabilities of prior melt fabricable thermoplastic materials. However, it has been found that polyarylene polyethers while possessing superior thermal properties, undergo undesirable thermal stress embrittlement. That is, load bearing or stressed articles molded from polyarylene polyethers will crack and craze when exposed to the same elevated temperatures that an unstressed article would otherwise withstand. In addition, it has also been found that polyarylene polyethers are notch sensitive, that is, they exhibit relatively low Izod impact (ASTM D256) values as compared to other engineering thermoplastic materials such as polycarbonates for example.

Unexpectedly, it has now been discovered that polyarylene polyethers are greatly improved in notched impact strength and resistance to thermal stress embrittlement by adding thereto from about 0.1 to about 20 percent by weight of an organopolysiloxane based on the weight of the polyarylene polyether. Of note is the fact that the incorporation of organopolysiloxanes in polyarylene polyethers does not adversely affect the desirable properties of the polyarylene polyether. It was also found that the incorporation of organopolysiloxanes into polyarylene polyether increases the melt flow and hence the processability and reduces the water vapor transmission of the latter.

Thermoplastic polyarylene polyethers used in the present invention are linear thermoplastic polymers having a basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-(4-hydroxyphenyl)-2-phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl (—CO—), sulfide (—S—), sulfone (—SO₂—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

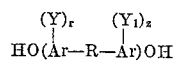

wherein Ar is an aromatic group and preferably is a phenylene group, Y and Y₁ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO₂—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane, 1,2-bis(4-hydroxyphenyl)ethane,
1,1-bis(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3,-hexafluoropropane
and the like;

Di(hydroxyphenyl)sulfones such as
bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like.

Di(hydroxyphenyl)ethers such as
bis-(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—SO$_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus are the halogen, however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably, the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent groups which can acitvate displacement of halogens on two different rings, such as the sulfone group —SO$_2$H—; the carbonyl group —CO—; the vinyl group —CH=CH—; the sulfoxide group —SO—; the azo group —N=N—; the saturated fluorocarbon groups —CF$_2$—CF$_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron wihtdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

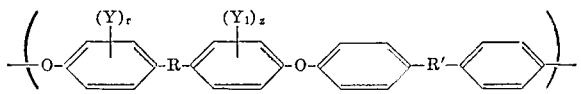

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is divalent connecting radical

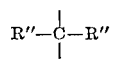

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula $$R-S(O)_z-R$$

wherein each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as co-solvents for the polymer during polymerization. Chlorobenzene, dichlorobenzene and xylene are azeotrope formers of this class. Preferably, the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The co-solvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C. are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

Any of the well known organopolysiloxanes can be used in this invention. Organopolysiloxanes can be liquids, gums, and resins which contain one or more of the following three types of siloxane structural units:

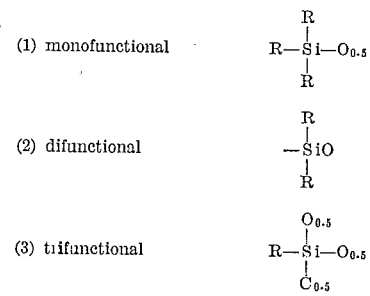

wherein R is a monovalent hydrocarbon radical. Also, some of the free valences of oxygen can be satisfied by carbon or hydrogen. Liquid organopolysiloxanes are relatively low molecular weight compounds having the general formula:

$$R_3SiO(R_2SiO)_xSiR_3$$

wherein R is a monovalent hydrocarbon radical and $x$ is an integer having an average value of from 0 to 3000. In addition to mono- and difunctional units, liquid organopolysiloxanes can also contain small amounts of trifunctional units in which case the liquid compound will contain some branching and internal cyclization. In addition, liquid organopolysiloxanes can contain small amounts of cyclic polysiloxanes of the formula $(R_2SiO)_m$ wherein R is a monovalent hydrocarbon radical and $m$ is an integer having a value of from about 3 to about 400 and higher.

Organopolysiloxane gums are closely related to liquid organopolysiloxanes in structure but are of higher molecular weight and viscosity. Gums are usually copolymers and can be represented by the general formula:

wherein R is a monovalent hydrocarbon radical, $y$ is an integer having a value of from about 4000 and higher, and X is an end-blocking group, e.g. OH or OR where R is as defined previously. Gums can also contain cyclic siloxanes as described previously. Suitable organopolysiloxane gums and their preparation are described in U.S. Patents 3,054,769 and 3,146,799. Organopolysiloxane gums can be compounded with fillers, plasticizers, colorants, and curing agents and cross linked to form elastomers or rubbers, as is well known in the art and as described, for example, in the foregoing patents.

Organopolysiloxane resins are solids that are usually complex interpolymers containing mono-, di- and trifunctional siloxane structural units and a variety of organo susbtituents attached to silicon atoms. Typically resins contain large amounts of trifunctional units and insufficient monofunctional units to stoichiometrically terminate the branching caused by the trifunctional units. Thus, resins typically contain reactive silanol end blocking groups. Suitable organopolysiloxane resins and their preparation are described in U.S. Patents 3,011,987 and 3,026,278.

Organopolysiloxanes may be prepared, for example, by the hydrolysis of hydrolyzable aliphatic-substituted silanes, such as dialiphatic dihalosilanes, for example, dimethyldichlorosilane, followed by complete or partial condensation of the hydrolysis product. They may also be prepared, for example, by hydrolyzing mixtures of hydrolyzable diorgano-substituted silanes either among themselves or with hydrolyzable silanes containing, for example, three organic radicals substituted on the silicon atom, for instance, trimethylchlorosilane.

A further method for preparing the organo-substituted polysiloxanes comprises hydrolyzing a diorgano-substituted dihalosilane, isolating the hydrolysis product and effecting reaction between the hydrolyzed product and, e.g., hexamethyl disiloxane in the presence of sulfuric acid. More specific directions for the hydrolysis of hydrolyzable organo-substituted silanes to form organo-substituted polysiloxanes may be found, for example, in patents and in the literature now available in the art.

By the term "hydrolyzable organo-substituted silanes" it is intended to mean derivatives of $SiH_4$ which contain hydrolyzable groups or radicals, for example, halogens, amino groups, alkoxy, aryloxy, acyloxy radicals, etc., in addition to the organic groups substituted directly on the silicon atom that are joined to the silicon through carbon-silicon linkages. Examples of such organic radicals are aliphatic radicals including alkyl radicals, for example, methyl, ethyl, propyl, isopropyl, butyl, etc.; alicyclic radicals, for example, cyclopentyl, cyclohexyl, etc.; aryl radicals, for example, phenyl, diphenyl, naphthyl, anthracyl, etc.; aralkyl radicals, for example, benzyl phenylethyl, etc.; alkaryl radicals, for example, tolyl, xylyl, etc.; heterocyclic radicals, etc.; as well as hydrolyzable silanes containing two different organic radicals, for example, methyl and phenyl radicals, etc.; attached to the silicon atom. If desired, the above-mentioned radicals may also contain substituents substituted thereon, for instance, halogens, e.g., di-, tri-, tetra-chlorophenylchlorosilanes, for example, trichlorophenyltrichlorosilane, tetrachlorophenyltrichlorosilane, etc.

Hydrolysis of the above silanes or mixtures of silanes results in the formulation of silanols, i.e., organo-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, for example, sulfuric acid, hydrochloric acid, ferric chloride, etc., as well as by basic materials, for example, sodium hydroxide, potassium hydroxide, etc. As a result of the hydrolysis and condensation, organo-substituted polysiloxanes may be produced which are partially or completely condensed and which may have on the average up to as high as three organic radicals substituted per silicon atom, but preferably from 1.98 to 2.25 organic groups per silicon. The liquid organopolysiloxanes prepared in this manner consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as the hydrolyzable radicals listed previously.

A typical organopolysiloxane gum is obtained by the condensation of a liquid organopolysiloxane containing an average of from about 1.95, preferably from about 1.98 to about 2.05, organic groups per silicon atom. The usual condensing agents, which may be employed and which are well known in the art include, for instance, ferric chloride hexahydrate, phenyl phosphoryl chloride, alkaline condensing agents such as potassium hydroxide, sodium hydroxide, etc. These convertible organopolysiloxanes generally contain polymeric diorganopolysiloxanes which may contain, for example, about 2 mole percent copolymerized mono-organopolysiloxane, for example, copolymerized monomethylsiloxane. Generally, the starting liquid organopolysiloxane is one which contains 1.999 to 2.01, inclusive, organic groups, for example, methyl groups, per silicon atom and where more than about 90 percent, preferably 95 percent, of the silicon atoms in the polysiloxane contain two silicon-bonded alkyl groups. A typical useful gum is prepared by mixing together about 95 mole percent octamethylcyclotetrasiloxane, and about 5 mole percent octaphenylcyclotetrasiloxane, at a temperature from about 150° C. to 175° C. for about 4 hours with about 0.01 percent potassium hydroxide based on the weight of the siloxane, until a highly viscous gummy solid is obtained. Generally, the amount of octaphenylcyclotetrasiloxane can be varied up to about 20 mole percent of the total mixture for the purpose of the invention.

Attention is directed to the convertible organopolysiloxanes disclosed in U.S. Patents 2,448,756, 2,448,556, 2,484,575, 2,457,688, 2,490,357, 2,521,528 and 2,541,137.

All of the aforementioned patents are incorporated herein by reference.

Admixing the polymeric constituents can be accomplished in any manner as long as a thorough blending of the organopolysiloxane and polyarylene polyether is obtained. For example, admixing may be accomplished by a variety of methods normally employed for incorporation of plasticizers or fillers into thermoplastic materials including but not limited to mixing rolls, dough-mixers, Banbury mixers, extruders, and other mixing equipment. The resulting mixtures may be handled in any conventional manner employed for the fabrication or manipulation of thermoplastic polymers. The mixtures can be molded using compression, injection, calendering and extrusion techniques. Alternatively, the admixing may be accomplished by mixing solutions of the two polymers which may thereafter be treated with a non-solvent to effect coprecipitation. The precipitated mixture may then be recovered in a dry state after filtration to remove the non-solvent and final evaporation of residual solvent. Dry blending a mixture of the individual polymers followed by thermal fusion is a convenient means for producing a conventional molding compound. In this procedure the dry blend may be extruded and chopped into pellets for subsequent use in injection molding procedures.

The mixtures of this invention may contain other additives to plasticize, extend, lubricate, prevent oxidation or lend color to the mixtures. Such additives are well known in the art and may be incorporated without departing from the scope of the invention.

Because of their excellent physical, mechanical, chemical, electrical, and thermal properties, the mixtures of this invention have many and varied uses. For example, they can be used in molding powder formulations either alone or mixed with various fillers to make molded parts and articles such as gears, ratchets, bearings, cams, impact parts, gaskets, valve seats, bottles, containers and the like. They can be used to prepare molded, calendered or extruded articles, films, coatings, threads, filaments, tapes, and the like. They can be applied to a broad spectrum of uses in form of sheets, rods, tapes and the like and are useful in electrical applications.

Because of the adhesive characteristics of the mixtures of this invention, they can be advantageously employed in one or more decorative, protective, structural or bonding capacities to provide structural elements comprising an adherend and an adherent mixture of organopolysiloxane and polyarylene polyether as described herein.

The terms "structural element" and "structural elements" as used herein refers to an assembly or assemblies of one or more discrete, planar, curvilinear, rectangular, round or odd shaped objects and a polymeric mixture of this invention. The assembly is characterized by an adhesive bond between a mixture and the object or objects. The terms comprehend, therefore, structural elements comprising an adherend, such as a substrate and an adhering layer of polymeric mixture as in a two-ply laminate or a coated substrate; structural elements comprising an interlayer of polymeric mixture sandwiched between and adhered to two similar or dissimilar adherends or laminate as in a plural ply laminate; structural elements comprising a polymeric mixture matrix surrounding and adhered to as a bond and/or a support for variously shaped and sized adherends such as articles of varying porosities, for example as the bonding agent and/or substrate in fiber-reinforced plastic articles; structural elements comprising structural members bonded together either closely adjacent or spaced apart by polymeric mixture elements; and combinations of the foregoing. The adherend preferably is readily wettable by the polymeric mixture either because of a polar nature such as characterizes metals, glass, and wood and is absent in polyethylene or because of surface treatment or cleanliness or for any other reason.

Adherends having a tangible surface or surfaces, preferably a tangible wettable surface or surfaces, to which polyhydroxyetherpolyarylene polyether mixtures readily adhere include metals, polar materials, vitreous materials, proteinaceous materials, cutaneous materials, cellulosic materials, natural resins, synthetic organic polymeric materials, nonmetallic materials, and the like. Adherends can be particulate, granular, fibrous, filamentary, ropy, woven, nonwoven, porous, nonporous, rigid, and non-rigid.

In one embodiment, the mixtures of this invention are advantageously formed into sheets which are subsequently formed against an original shape such as a copper etched printing plate to form a matrix. The depth of an impression made in a matrix is more commonly referred to in the art as a "floor." Thus a matrix having an impression 30 mils deep is referred to as a matrix having 30 mil floor. In the copending application of J. B. Wheeler III, Ser. No. 365,797, filed May 7, 1964, there is described a thermoplastic matrix formed from a sheet of polyarylene polyether as described herein. The manner of forming such a matrix and the molding of duplicates from the matrix are also described in said application. It has been found however that when sheets of polyarylene polyether are formed into a matrix, because of its low notched impact strength, the matrix tends to crack and even break in extreme cases when it is separated from the original against which it was formed. It has now been discovered that matrixes formed from the mixtures of this invention will not break or crack when separated from an original.

Films formed from the mixtures of this invention by conventional techniques are useful as wrapping or packaging materials, as liners for containers, covers, closures, and the like, as electrical insulating tapes, pipe coverings and the like.

Because of their desirable properties, the mixtures of this inventon can be used as an insulating material for electrical conductors such as wire and cable, as slot insulation in dynamelectric machines, as surface coverings for appliances and the like, as coatings for rods and the like, in wire enamels, varnishes, paints and the like.

The following examples are intended to further illustrate the present invention without limiting the same in any manner. Parts and percentages given are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which has been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution.

EXAMPLE 1

Preparation of thermoplastic polyarylene polyether

In a 250 ml. flask epuipped with a stirrer, thermometer, a water cooled condenser and a Dean-Stark moisture trap filled with benzene, there were placed 11.42 grams of 2,2-bis(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C. consisting of the dipotassium salt of the 2,2-bis(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° C. with good stirring for 4–5 hours. The viscous, orange solution was poured into 300 ml. water, rapidly circulating a Waring Blendor, and the finely divided white polymer was filtered and then dried in a vacuum oven at 100° C. for 16 hours. The yield was 22.2 g. (100%) and the reaction was 99% complete based on a titration for residual base.

The polymer had the basic structure

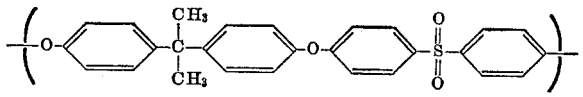

Organopolysiloxanes used herein are described as follows (term "silicone" is used herein as a synonym for "siloxane").

(A) A liquid trimethylsilicone endblocked dimethylsilicon having a viscosity of 12,500 centistokes at 25° C.

(B) A liquid methylsilicone sold under the designation SF-96 by General Electric Corp.

(C) A devolatilized polysiloxane copolymer gum containing 99.8 percent dimethylsilicone units and 0.2 percent vinylmethylsilicone units.

(D) A polysiloxane copolymer gum containing 87.7 percent dimethylsilicone units, 12.0 percent diphenylsilicone, and 0.2 percent vinylmethylsilicone units.

(E) A polysiloxane copolymer gum containing 99.7 percent dimethylsilicone units and 0.3 percent vinylmethylsilicone units.

(F) A devolatilized polysiloxane copolymer gum containing 84.8 percent dimethylsilicone units 15.0 percent diphenylsilicone units, and 0.2 percent vinylmethylsilicone units.

(G) A compound polysiloxane gum containing

| | Parts |
|---|---|
| Polysiloxane gum D | 100 |
| Silica (high surface fume) | 42 |
| Fluid Y [1] | 14.2 |
| Iron solution [2] | 0.2 |

[1] An ethoxy terminated dimethylsilicone liquid containing 12 percent ethoxy groups.
[2] An iron 2-ethylhexoate solution containing 6 percent iron.

(H) A compound polysiloxane gum containing

| | Parts |
|---|---|
| Polysiloxane gum C | 100 |
| Silica (high surface fume) | 42 |
| Fluid Y | 14.2 |
| Iron solution | 0.2 |

(I) A compound polysiloxane gum containing

| | Parts |
|---|---|
| Polysiloxane gum F | 100 |
| Silica (high surface fume) | 42 |
| Fluid Y | 14.2 |
| Iron solution | 0.2 |

(J) A compounded polysiloxane gum containing

| | Parts |
|---|---|
| Polysiloxane gum D | 100 |
| Silica (medium surface fume) | 25 |
| Fluid Y | 9.8 |
| Iron solution | 0.25 |

(K) A solventless polysiloxane resin consisting of

| | Mole percent |
|---|---|
| Dimethylsilicone units | 22.5 |
| Diphenylsilicone units | 40.0 |
| Trimethylsilicone units | 7.5 |

The following test procedures were used to obtain data:

Tensile porperties—ASTM D-368-60T
Flexural properties—ASTM D-790-59T
Heat distortion temperature—ASTM D-1637-59T
Melt flow—ASTM D-1237-59T
Izod impact—ASTM D-256

EXAMPLE 2

Polyarylene polyether having a reduced viscosity of 0.72 and prepared as in Example 1 was fluxed in a Banbury mixer, a liquid polysiloxane previously mixed with finely divided silica was added, mixed for ten minutes, cooled and discharged. The mixture was then molded into ⅛ inch bars for impact testing. Results are summarized below.

| Type polysiloxane | Percent polysiloxane | Percent silica | Izod impact (⅛" notched), ft. lbs./in. |
|---|---|---|---|
| A | 3 | 0.04 | 9.5 |
| B | 3 | 1.1 | 15.9 |
| Control | 0 | 0 | 1.0 |

This example demonstrates that organopolysiloxane incorporated in polyarylene polyether in concentrations as low as 3 percent produce a 950 percent improvement in Izod impact.

EXAMPLE 3

Polyarylene polyether prepared as in Example 1 and having a reduced viscosity of 0.52 was mixed with liquid polysiloxane A as in Example 2. The mixture was molded into test specimens and tested for various properties along with an unmodified polyarylene polyether specimen as a control. Results are summarized below.

| | Percent polysiloxane A | | | |
|---|---|---|---|---|
| | 1.5 | 3.0 | 5.0 | 0 (control) |
| Flexural strength, p.s.i | 15,600 | 15,000 | 13,7000 | 16,400 |
| Flexural modulus at 5+, p.s.i | 409,000 | 402,000 | 377,000 | 411,000 |
| Rockwell hardness | 118 | 120 | 113 | 122 |
| Tensile strength, p.s.i | 8,400 | 8,300 | 7,500 | 10,500 |
| Elongation after yield, percent | 1-45 | 9-81 | 4-45 | 18-103 |
| Izod impact strength, ⅛" notched, ft. lbs./in. at 23° C | 11.6 | 8.7 | 2.2 | |
| Heat distortion temperature, ° C., 264 p.s.i | 172 | 173 | 174 | 171 |

This example demonstrates that the addition of a liquid organopolysiloxane to polyarylene polyether has no adverse effect on the general properties of the polyarylene polyether yet it greatly improves its Izod impact strength and resistance to thermal stress embrittlement.

In addition, the three mixtures of this example were extruded onto wire. In each case the presence of organopolysiloxane in the polyarylene polyether improved the processing characteristics of the latter resulting in smoother more uniform coatings. To test for resistance to thermal stress embrittlement, short sections of wire coated with each mixture were wrapped on a mandrel having a diameter equal to 25 times the diameter of the coated wire. The wrapped specimens, after aging overnight at 120° C., 150° C., and 170° C. showed no signs of crazing or cracking whereas a specimen prepared from unmodified polyarylene polyether showed severe crazing and cracking.

EXAMPLES 4–51

These examples demonstrate the improvement in resistance to thermal stress embrittlement gained by incorporating organopolysiloxane in polyarylene polyether. Mixtures were prepared by blending in a Braebender plasticord followed by extrusion onto 0.032" diameter wire using a ¾ inch Egan extruder having a conveyor type screw of constant pitch and depth. Coated wire samples were then wrapped ten times on a mandrel, subjected to thermal aging and tested for voltage to breakdown (average of 3 samples) using a step-up transformer having an upper limit of 15,000 volts for an input of 115 volts. For control purposes, coated wire samples were prepared from unmodified polyarylene polyether in the same manner and subjected to the same test. Each of the coated wire samples prepared from the mixture of this invention (1) showed excellent ductility in that the samples could be unwound without cracking or breaking the coating, (2) showed no crazing or cracking after thermal aging, (3) showed a retention of voltage to breakdown (resistance to thermal stress embrittlement). The control samples prepared from unmodified polyarylene polyether failed in all three of these items. Results are summarized below.

EXAMPLES

| Example No. | Polyarylene polyether, PV | Type polysiloxane | Percent polysiloxane | Thermal aging | | Mandrel diameter, mils | Coating thickness, mils | Voltage to breakdown, volts×10² |
|---|---|---|---|---|---|---|---|---|
| | | | | Days | Temp.,° C. | | | |
| 4 | 0.62 | G | 1.5 | 0 | 23 | 125 | 8–8.5 | 90–126 |
| 5 | 0.72 | G | 2.5 | 0 | 23 | 125 | 13.5–14 | >168 |
| 6 | 0.72 | G | 3.25 | 0 | 23 | 125 | 14.5–16 | >168 |
| 7 | 0.62 | G | 4.5 | 0 | 23 | 125 | 9–10 | 102–131 |
| 8 | 0.62 | G | 1.5 | 40 | 120 | 125 | 8.5–10.5 | 54–60 |
| 9 | 0.62 | G | 1.5 | 40 | 150 | 125 | 9.5–10 | 78–168 |
| 10 | 0.62 | G | 1.5 | 40 | 170 | 125 | 4.5–9.5 | 12–132 |
| 11 | 0.72 | G | 2.5 | 40 | 120 | 125 | 12–13 | 66–144 |
| 12 | 0.72 | G | 2.5 | 40 | 150 | 125 | 11.5–13.5 | 24–132 |
| 13 | 0.72 | G | 2.5 | 40 | 170 | 125 | 12–15 | 9–144 |
| 14 | 0.72 | G | 3.25 | 40 | 120 | 125 | 13.5–14 | 132–>168 |
| 15 | 0.72 | G | 3.25 | 40 | 150 | 125 | 14.9–15.9 | 120–156 |
| 16 | 0.72 | G | 3.25 | 40 | 170 | 125 | 15–15.5 | 144–>168 |
| 17 | 0.62 | G | 4.5 | 40 | 120 | 125 | 8–10 | 54–90 |
| 18 | 0.62 | G | 4.5 | 40 | 150 | 125 | 8.5–9 | 78–108 |
| 19 | 0.62 | G | 4.5 | 40 | 170 | 125 | 6.5–10.5 | 12–126 |
| 20 | 0.72 | D | 3.25 | 0 | 23 | 50 | 7–11.5 | 156–>168 |
| 21 | 0.72 | D | 3.25 | 0 | 23 | 125 | 6.5–11 | 162–>168 |
| 22 | 0.72 | D | 3.25 | 30 | 120 | 50 | 11–12 | 84–156 |
| 23 | 0.72 | D | 3.25 | 30 | 120 | 125 | 9–11.5 | 156–>168 |
| 24 | 0.72 | D | 3.25 | 30 | 150 | 50 | 9.11 | 132–162 |
| 25 | 0.72 | D | 3.25 | 30 | 150 | 125 | 10.5–12 | 156–>168 |
| 26 | 0.72 | D | 3.25 | 30 | 170 | 50 | 9.5–12 | 114–156 |
| 27 | 0.72 | D | 3.25 | 30 | 170 | 125 | 9–13 | 144–>168 |
| 28 | 0.72 | C | 3.25 | 0 | 23 | 50 | 8.5–11 | 126–>168 |
| 29 | 0.72 | C | 3.25 | 0 | 23 | 125 | 8–11 | 144–>168 |
| 30 | 0.72 | C | 3.25 | 30 | 120 | 50 | 9–10.5 | 144–168 |
| 31 | 0.72 | C | 3.25 | 30 | 120 | 125 | 10–11 | 144–>168 |
| 32 | 0.72 | C | 3.25 | 30 | 150 | 50 | 9–11 | 54–70 |
| 33 | 0.72 | C | 3.25 | 30 | 150 | 125 | 9–10 | 72–144 |
| 34 | 0.72 | C | 3.25 | 30 | 170 | 50 | 9–10 | 60–96 |
| 35q | 0.72 | C | 3.25 | 30 | 170 | 125 | 9.5–10 | 84–138 |
| 36 | 0.72 | G | 3.25 | 0 | 23 | 50 | 14.5–16 | 162–>168 |
| 37 | 0.72 | G | 3.25 | 0 | 23 | 125 | 14–16 | >168 |
| 38 | 0.72 | G | 3.26 | 30 | 120 | 50 | 14.5–17 | 24–132 |
| 39 | 0.72 | G | 3.25 | 30 | 120 | 125 | 7.5–16 | 30–72 |
| 40 | 0.72 | G | 3.25 | 30 | 150 | 50 | 12.5–16 | 162–>168 |
| 41 | 0.72 | G | 3.25 | 30 | 150 | 125 | 13.5–17 | 102–>168 |
| 42 | 0.72 | G | 3.25 | 30 | 170 | 50 | 12–18 | 103–>168 |
| 43 | 0.72 | G | 3.25 | 30 | 170 | 125 | 14.5–16 | 150–>168 |
| 44 | 0.72 | H | 3.25 | 0 | 23 | 50 | 13–17 | >168 |
| 45 | 0.72 | H | 3.25 | 0 | 23 | 125 | 13–15 | >168 |
| 46 | 0.72 | H | 3.25 | 30 | 130 | 50 | 10.5–13 | 84–168 |
| 47 | 0.72 | H | 3.25 | 30 | 120 | 125 | 10.5–14 | 162–>168 |
| 48 | 0.72 | H | 3.25 | 30 | 150 | 50 | 12–14 | 138–>168 |
| 49 | 0.72 | H | 3.25 | 30 | 150 | 125 | 12.5–15.5 | 150–>168 |
| 50 | 0.72 | H | 3.25 | 30 | 170 | 50 | 10–12.5 | 132–162 |
| 51 | 0.72 | H | 3.25 | 30 | 170 | 125 | 10–14.5 | 114–>168 |

CONTROLS

| Control No. | Polyarylene polyether, RV | Thermal aging | | Mandrel Diameter, mils | Coating thickness, mils | Voltage to breakdown, volts×10² |
|---|---|---|---|---|---|---|
| | | Days | Temp.,° C. | | | |
| I | 0.72 | 0 | 23 | 50 | 12.5–13.5 | >168 |
| II | 0.72 | 0 | 23 | 125 | 10.5–13.5 | 132–>168 |
| III | 0.72 | 30 | 120 | 50 | 12.5–15 | 24–108 |
| IV | 0.72 | 30 | 120 | 125 | 11.5–14 | 42–60 |
| V | 0.72 | 30 | 150 | 50 | 12.5–14 | 36–84 |
| VI | 0.72 | 30 | 150 | 125 | 13–14.5 | 66–126 |
| VII | 0.72 | 30 | 170 | 50 | 12–13.5 | 36–90 |
| VIII | 0.72 | 30 | 170 | 125 | 13–14 | 90–144 |

EXAMPLES 2–59

These examples demonstrate the improved notched impact strength of the mixtures of this invention as compared to unmodified polyarylene polyether. Mixtures of polyarylene polyether prepared as in Example 1 and polysiloxane were prepared by mixing in a steam heated Banbury mixer, and compression molded into impact test samples. Results are summarized below.

| Example No. | Polyarylene polyether, RV | Type polysiloxane | Percent polysiloxane | Izod impact ⅛″ notched, ft. lbs./in. |
|---|---|---|---|---|
| 52 | 0.72 | G | 3.25 | 13.9 |
| 53 | 0.62 | G | 1.0 | 14.2 |
| | | D | 3.9 | |
| 54 | 0.52 | D | 3.4 | 14.1 |
| 55 | 0.72 | C | 2.25 | 8.7 |
| 56 | 0.72 | D | 2.25 | 8.8 |
| 57 | 0.72 | G | 3.25 | 12.3 |
| 58 | 0.72 | H | 3.25 | 8.3 |
| 59 | 0.72 | J | 3.25 | 11.9 |
| Control | 0.72 | None | 0 | 1.21 |
| Do | 0.62 | None | 0 | 1.19 |
| Do | 0.52 | None | 0 | 1.3 |

EXAMPLE 60

A mixture of polyarylene polyether prepared as in Example 1 having an RV of 0.52, 3.5 percent of polysiloxane C and 4.4 percent silica was prepared by blending in a steam heated Banbury mixer and pressed into a 75 mil sheet. This sheet was compression molded against an etched copper original printing plate to form a matrix having a 30 mil floor. Molding was carried out at 450° C. with a three minute preheat and one minute under pressure. No difficulty was encountered in stripping the matrix from the copper original, that is, no cracks or breaks appeared. The matrix faithfully reproduced the original. A similar 30 mil floor matrix formed from a 75 mil sheet of unmodified polyarylene polyether cracked badly when stripped from the original. In addition to improving the impact strength of polyarylene polyethers, organopolysiloxanes also improve the melt flow (processability) of these polymers. Consequently faithful reproduction of an original is possible in shorter molding cycles.

This improvement in melt flow was demonstrated by comparing the melt flow of unmodified polyarylene polyether prepared as in Example 1 having a RV of 0.52 and this same polymer blended with 3.25 of polysiloxane C and 4.4% silica. Results are summarized below.

|  | Melt flow at 350° C. | | |
| --- | --- | --- | --- |
|  | 44 p.s.i. | 220 p.s.i. | 440 p.s.i. |
| Unmodified polyarylene polyether | 8.66 | 60.4 | 151.2 |
| Polysiloxane C—polyarylene polyether mixture | 11.8 | 110.7 | 314.0 |

EXAMPLE 61

To demonstrate that the incorporation of a polysiloxane gum in polyarylene polyether does not adversely effect the general properties of the polymer, unmodified polyarylene polyether prepared as in Example 1 and having a RV of 0.72 was compared to a mixture of this same polymer and 3.25% of polysiloxane C. Results are summarized below:

|  | Unmodified polyarylene polyether | Polysiloxane D— polyarylene polyether mixture |
| --- | --- | --- |
| Tensile modulus, p.s.i. | 360,000 | 328,000 |
| Tensile strength, p.s.i. | 10,200 | 9,300 |
| Elongation, percent | 50–100 | 30–90 |
| Flexural strength | 15,400 | 15,200 |
| Flexural modulus | 400,000 | 392,000 |
| Izod Impact, ⅛" notched ft. lbs./in. | 1.3 | 14 |
| Heat Distortion Temperature ° C. at 264 p.s.i. | 175 | 177–178 |
| Water absorption, percent per 24 hours at 23° C. | 0.22 | 0.21 |
| Volume resistivity, ohm-cm. at 23° C. | 3.3×10$^{16}$ | 3.6×10$^{16}$ |
| Dielectric constant, at 23° C., 60 c.p.s. | 3.13 | 2.66 |
| Power factor, at 23° C., 60 c.p.s. | 0.0005 | 0.00073 |

EXAMPLE 62

To demonstrate that the incorporation of an organopolysiloxane in polyarylene polyether reduces the water vapor transmission of the latter, a sample of unmodified polyarylene polyether prepared as in Example 1 and having a RV of 0.62 was compared to a sample of a mixture of this same polymer and 4.5 percent of polysiloxane D. The water vapor transmission in gm.-mil per 100 in.² for 24 hours at atmospheric pressure for the unmodified sample was 110 whereas the mixture sample it was only 27.

EXAMPLE 63

Thermoplastic polyarylene polyether composed of recurring units having the formula:

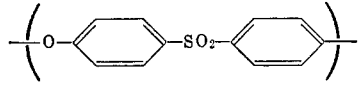

is prepared from 4,4'-dihydroxydiphenylsulfone and 4,4'-dichlorodiphenylsulfone according to the procedure of Example 1. A mixture prepared from this polymer and 10 percent of polysiloxane K exhibits an improvement in notched impact strength and an improvement in resistance to thermal stress embrittlement as compared to the unmodified polymer.

EXAMPLE 64

Thermoplastic polyarylene polyether composed of recurring units having the formula:

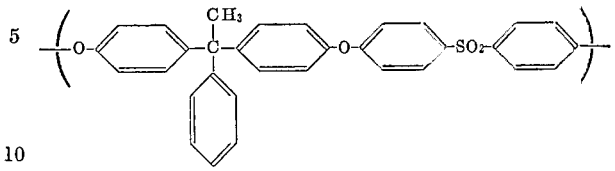

is prepared from the bisphenol of acetophenone and 4,4'-dichlorodiphenylsulfone according to the procedure of Example 1. A mixture prepared from this polymer and 7 percent of polysiloxane I exhibits an improvement in notched impact strength and an improvement in resistance to thermal stress embrittlement as compared to the unmodified polymer.

EXAMPLE 65

Thermoplastic polyarylene polyether composed of recurring units having the formula

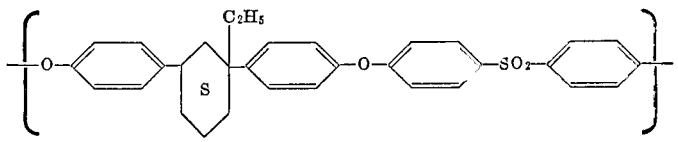

is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure of Example 1. A mixture prepared from this polymer and 15 percent of polysiloxane E exhibits an improvement in notched impact strength and an improvement in resistance to thermal stress embrittlement as compared to the unmodified polymer.

EXAMPLE 66

Thermoplastic polyarylene polyether composed of recurring units having the formula

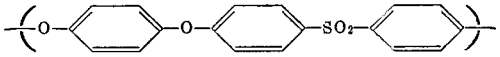

is prepared from hydroquinone and 4,4'-dichlorodiphenylsulfone according to the procedure of Example 1. A mixture prepared from this polymer and 13 percent of polysiloxane F exhibits an improvement in notched impact strength and an improvement in resistance to thermal stress embrittlement as compared to the unmodified polymer.

EXAMPLE 67

Thermoplastic polyarylene polyether composed of recurring units having the formula

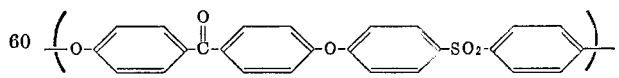

is prepared from 4,4'-dihydroxybenzophenone and 4,4'-dichlorodiphenylsulfone according to the procedure of Example 1. A mixture prepared from this polymer and 20 percent of polysiloxane K exhibits an improvement in notched impact strength and an improvement in resistance to thermal stress embrittlement as compared to the unmodified polymer.

EXAMPLE 68

Thermoplastic polyarylene polyether composed of recurring units having the formula

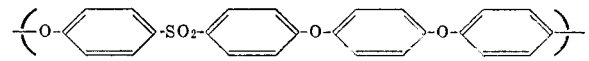

is prepared from 4,4′-dihydroxydiphenylether and 4,4′-dichlorodiphenylsulfone according to the procedure of Example 1. A mixture prepared from this polymer and 15 percent of polysiloxane F exhibits an improvement in notched impact strength and an improvement in resistance to thermal stress embrittlement as compared to the unmodified polymer.

EXAMPLE 69

Thermoplastic polyarylene polyether composed of recurring units having the formula

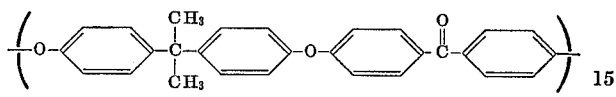

is prepared from 2,2′-bis-(4-hydroxyphenyl)propane and 4,4′-difluorobenzophenone according to the procedure of Example 1. A mixture prepared from this polymer and 10 percent of polysiloxane I exhibits an improvement in notched impact strength and an improvement in resistance to thermal stress embrittlement as compared to the unmodified polymer.

I claim:

1. Polymeric mixture characterized by improved impact strength and improved resistance to thermal stress embrittlement comprising from about 0.1 to about 20 percent by weight of an organopolysiloxane comprising liquids, gums and resins containing one or more of the siloxane structural units

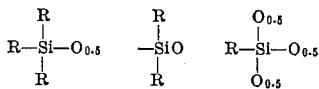

wherein R is a monovalent hydrocarbon radical and a linear thermoplastic polyarylene polyether composed of recurring units having the formula:

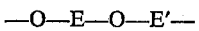

wherein E is the residuum of a dihydric phenol and E′ is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

2. Mixture defined in claim 1 wherein said polyarylene polyether is composed of recurring units having the formula:

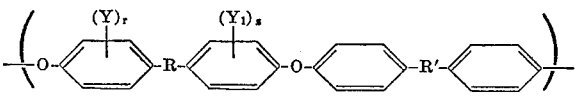

wherein R represents a member of the group consisting of a bond between aromatic carbon atoms and a divalent connecting radical and R′ represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive.

3. Mixture defined in claim 1 wherein said polyarylene polyether is composed of recurring units having the formula:

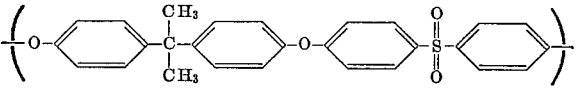

4. Mixture defined in claim 1 wherein said polyarylene polyether is composed of recurring units having the formula

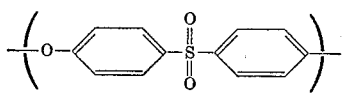

5. A structural element comprising an adherend and adhering thereto a mixture of from about 0.1 to about 20 percent by weight of an organopolysiloxane comprising liquids, gums and resins containing one or more of the siloxane structural units

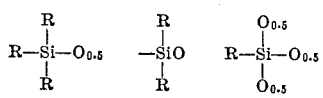

wherein R is a monovalent hydrocarbon radical and a linear thermoplastic polyarylene polyether composed of recurring units having the formula

wherein E is the residuum of a dihydric phenol and E′ is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

6. Structural element of claim 5 wherein said thermoplastic polyarylene polyether is composed of recurring units having the formula:

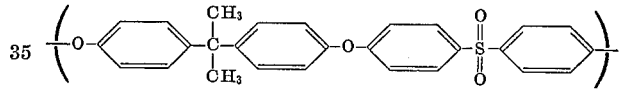

7. Structural element of claim 5 wherein said thermoplastic polyarylene polyether is composed of recurring units having the formula

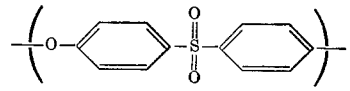

8. Electrical conductor coated with an insulating material comprising of from about 0.1 to about 20 percent by weight of an organopolysiloxane comprising liquids, gums and resins containing one or more of the siloxane structural units

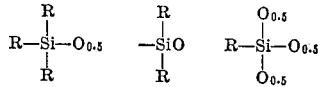

wherein R is a monovalent hydrocarbon radical and a linear thermoplastic polyarylene polyether composed of recurring units having the formula:

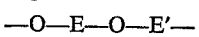

wherein E is the residuum of a dihydric phenol and E′ is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

9. Molded structure comprising a mixture of from about 0.1 to about 20 percent by weight of an organopolysiloxane comprising liquids, gums and resins containing one or more of the siloxane structural units

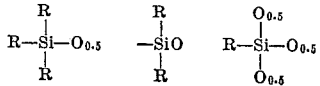

wherein R is a monovalent hydrocarbon radical and a linear thermoplastic polyarylene polyether composed of recurring units having the formula

—O—E—O—E'— wherein E is the residuum of a dihydric phenol and E' is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

10. Matrix formed from a sheet comprising a mixture of from about 0.1 to about 20 percent by weight of an organopolysiloxane comprising liquids, gums and resins containing one or more of the siloxane structural units

wherein R is a monovalent hydrocarbon radical and a linear thermoplastic polyarylene polyether composed of recurring units having the formula:

—O—E—O—E'— wherein E is the residuum of a dihydric phenol and E' is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

11. Matrix of claim 10 wherein said sheet has a thickness of not greater than 75 mils and said matrix has a floor of not greater than 30 mils.

References Cited

UNITED STATES PATENTS 3,063,872  11/1962  Boldebuck _____ 260—824

SAMUEL H. BLECH, *Primary Examiner.*

U.S. Cl. X.R.

260—29.1, 37; 117—161, 232; 161—400, 116